US012321625B2

(12) United States Patent
Pitchumani et al.

(10) Patent No.: US 12,321,625 B2
(45) Date of Patent: *Jun. 3, 2025

(54) OFFLOADED DEVICE-DRIVEN ERASURE CODING

(71) Applicant: Samsung Electronics Co., Ltd., Suwon-si (KR)

(72) Inventors: Rekha Pitchumani, Oak Hill, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,019

(22) Filed: Dec. 27, 2021

(65) Prior Publication Data

US 2022/0121363 A1    Apr. 21, 2022

Related U.S. Application Data

(63) Continuation of application No. 15/930,422, filed on May 12, 2020, now Pat. No. 11,210,002.

(Continued)

(51) Int. Cl.
*G06F 11/14* (2006.01)
*G06F 3/06* (2006.01)
*G06F 11/20* (2006.01)

(52) U.S. Cl.
CPC ............ *G06F 3/064* (2013.01); *G06F 3/0619* (2013.01); *G06F 3/0652* (2013.01); *G06F 3/067* (2013.01);
(Continued)

(58) Field of Classification Search
None
See application file for complete search history.

(56) References Cited

U.S. PATENT DOCUMENTS 7,979,771 B2   7/2011  Margolus et al.
8,402,201 B2   3/2013  Flynn et al.
(Continued)

FOREIGN PATENT DOCUMENTS

TW    201729068 A    8/2017
WO   2016022993 A2   2/2016

OTHER PUBLICATIONS

Huang, Cheng et al., "Erasure Coding in Windows Azure Storage," USENIX, Jun. 2012 (Year: 2012), 12 pages.
(Continued)

*Primary Examiner* — Elias Mamo
(74) *Attorney, Agent, or Firm* — Renaissance IP Law Group LLP

(57) ABSTRACT

A method for storing data may include receiving user data at a group of storage devices, wherein the storage devices are interconnected, erasure coding the user data into redundancy blocks at the group of storage devices, and storing the redundancy blocks on at least two of the storage devices. The erasure encoding may be distributed among at least two of the storage devices. The redundancy blocks may be arranged in reliability groups. The redundancy blocks may be grouped by the storage devices independently of the partitioning of the user data by the user. The method may further include recovering data based on redundancy blocks. A storage device may include a storage medium, a network interface configured to communicate with one or more other storage devices, and a storage processing unit configured to erasure code user data into redundancy blocks cooperatively with the one or more other storage devices.

20 Claims, 9 Drawing Sheets

Related U.S. Application Data

(60) Provisional application No. 62/967,573, filed on Jan. 29, 2020.

(52) U.S. Cl.
CPC ........ *G06F 3/0689* (2013.01); *G06F 11/1448* (2013.01); *G06F 11/2089* (2013.01)

(56) References Cited

U.S. PATENT DOCUMENTS

| | | | |
|---|---|---|---|
| 8,458,287 B2 * | 6/2013 | Ozzie | H03M 13/05 714/763 |
| 8,713,405 B2 * | 4/2014 | Healey, Jr. | G06F 3/061 714/763 |
| 8,862,818 B1 | 10/2014 | Ozdemir | |
| 9,047,306 B1 * | 6/2015 | Frolund | G06F 16/178 |
| 9,244,761 B2 | 1/2016 | Yekhanin et al. | |
| 9,465,692 B2 | 10/2016 | Doerner | |
| 9,946,642 B2 | 4/2018 | Tomlin et al. | |
| 10,019,315 B2 * | 7/2018 | Kato | G06F 3/0619 |
| 10,079,612 B1 | 9/2018 | Li | |
| 10,289,547 B2 | 5/2019 | Malina et al. | |
| 10,402,266 B1 | 9/2019 | Kirkpatrick et al. | |
| 10,437,672 B2 | 10/2019 | Baker et al. | |
| 10,552,058 B1 | 2/2020 | Jadon et al. | |
| 10,817,392 B1 | 10/2020 | McAuliffe et al. | |
| 10,901,848 B2 | 1/2021 | Roberts | |
| 10,983,859 B2 | 4/2021 | Davis et al. | |
| 2009/0089612 A1 | 4/2009 | Mathew et al. | |
| 2011/0264884 A1 | 10/2011 | Kim | |
| 2015/0301934 A1 | 10/2015 | Baderdinni et al. | |
| 2016/0217040 A1 | 7/2016 | Jin et al. | |
| 2016/0219120 A1 | 7/2016 | Vairavanathan et al. | |
| 2016/0334996 A1 | 11/2016 | Zhong et al. | |
| 2016/0371145 A1 | 12/2016 | Akutsu et al. | |
| 2017/0077950 A1 | 3/2017 | Pavlov et al. | |
| 2017/0272209 A1 | 9/2017 | Yanovsky et al. | |
| 2017/0329532 A1 | 11/2017 | Goss et al. | |
| 2018/0196745 A1 | 7/2018 | Karr et al. | |
| 2018/0321876 A1 | 11/2018 | Ballapuram et al. | |
| 2018/0357019 A1 | 12/2018 | Karr et al. | |
| 2019/0065389 A1 | 2/2019 | Choi et al. | |
| 2019/0102250 A1 | 4/2019 | O'Krafka et al. | |
| 2019/0114114 A1 * | 4/2019 | Trika | H03M 13/154 |
| 2019/0215013 A1 | 7/2019 | Anderson | |
| 2020/0133552 A1 * | 4/2020 | Zolotow | H03M 13/3761 |
| 2020/0136656 A1 * | 4/2020 | Monk | H03M 13/2906 |
| 2020/0264800 A1 | 8/2020 | Wysocki et al. | |
| 2021/0133026 A1 | 5/2021 | Horn | |

OTHER PUBLICATIONS

Notice of Allowance for U.S. Appl. No. 15/930,422, mailed Aug. 17, 2021.

Office Action for U.S. Appl. No. 15/930,422, mailed Feb. 19, 2021.

Pritchard, Stephen, "RAID, Flash and Erasure Coding: What Works Best with Solid State?," ComputerWeekly.com, Dec. 4, 2020 (Year: 2020), 6 pages.

Office Action for U.S. Appl. No. 17/850,984, mailed Feb. 16, 2023.

European Summons to Oral Proceedings for Application No. 21152021.8, mailed May 15, 2023.

Final Office Action for U.S. Appl. No. 17/850,984, mailed Sep. 11, 2023.

Office Action for U.S. Appl. No. 17/850,984, mailed Jan. 19, 2024.

Final Office Action for U.S. Appl. No. 17/850,984, mailed Aug. 1, 2024.

Notice of Allowance for U.S. Appl. No. 17/850,984, mailed Oct. 30, 2024.

* cited by examiner

OFFLOADED DEVICE-DRIVEN ERASURE CODING

REFERENCE TO RELATED APPLICATIONS

This application is a continuation of U.S. patent application Ser. No. 15/930,422 filed May 12, 2020 which is incorporated by reference and claims priority to, and the benefit of, U.S. Provisional Patent Application Ser. No. 62/967,573 titled "System, Device and Method For Offloaded, Device-Driven Erasure Coding For Fabric-Enabled Computational Storage Devices" filed Jan. 29, 2020 which is incorporated by reference.

BACKGROUND

1. Field

This disclosure relates generally to erasure coding in data storage systems, and more specifically to methods and apparatus for offloaded, device-driven erasure coding.

2. Related Art

Erasure coding (EC) may refer to a technique that may be used to improve reliability and overcome data losses in data storage systems having multiple storage devices such as hard disc drives (HDDs) or solid state drives (SSD). In a storage system with erasure coding, a file or other unit of data may be divided into multiple fixed-size data blocks. A coding algorithm such as Reed-Solomon may be used to calculate one or more blocks of parity data based on the data blocks. The data blocks and parity blocks may then be stored on separate storage devices. If one of the storage devices fails, the data block that was on the failed device may be reconstructed using the remaining data blocks and one or more parity blocks. The parameters of the coding algorithm, such as the ratio of parity blocks to data blocks, may be adjusted to make trade-offs between storage efficiency and data reliability.

SUMMARY

A method for storing data may include receiving user data at a group of storage devices, wherein the storage devices are interconnected, erasure coding the user data into redundancy blocks at the group of storage devices, and storing the redundancy blocks on at least two of the storage devices. The erasure encoding may be distributed among at least two of the storage devices. The redundancy blocks may be arranged in reliability groups. Each of the storage devices may maintain metadata about the reliability groups of its redundancy blocks. The user data may be received from a user, and the user data may be partitioned between the storage devices by the user. The redundancy blocks may be grouped by the storage devices independently of the partitioning of the user data by the user.

At least one of the storage devices may be capable of computational storage, and the user may partition the user data between the storage devices based on computations to be performed on the user data. The user data may be arranged in logical blocks, and a redundancy block may include multiple logical blocks. At least one of the storage devices may send a write acknowledgment in response to receiving the user data. At least one of the storage devices may send a reliable write acknowledgment based on the erasure coding of the user data. The method may further include recovering data based on redundancy blocks. Recovering data based on redundancy blocks may include recovering data from live redundancy blocks. Recovering data based on redundancy blocks may include recovering data only from live redundancy blocks. The redundancy blocks may be self-descriptive to facilitate recovering data.

Each storage device may inform every other storage device having a redundancy block in a reliability group about a redundancy block in the reliability group that may be erased, and erases the redundancy block in response to receiving a proceed signal from every other storage device having a redundancy block in the reliability group. A first storage device of the group of storage devices may inform a second storage device of the group of storage devices about a redundancy block that may be erased. The first storage device may erase the redundancy block in response to receiving a proceed signal from the second storage device. The first storage device of the group of storage devices may be informed by a second storage device of the group of storage devices that a redundancy block in a reliability group is to be erased by the second storage device, and may examine its own redundancy block in the reliability group. The first storage device may send a proceed signal to the second storage device. The first storage device may send a request to the other storage devices having a redundancy block in the reliability group that its own redundancy block in the reliability group be added to a new reliability group. The group of storage devices may recalculate parity for a reliability group based on erasure of a redundancy block in the reliability group.

A storage device may include a storage medium, a network interface configured to communicate with one or more other storage devices, and a storage processing unit configured to erasure code user data into redundancy blocks cooperatively with the one or more other storage devices. The storage processing unit may be configured to recover data based on one or more of the redundancy blocks. The storage processing unit may be configured to initiate a parity recalculation in response to a garbage collection operation on one or more of the redundancy blocks. The redundancy blocks may be arranged in reliability groups. The storage processing unit may be configured to inform one or more other storage devices having a redundancy block in a reliability group about a redundancy block in the reliability group that to be erased, and erase the redundancy block in response to receiving a proceed signal from the one or more other storage devices having a redundancy block in the reliability group.

A data storage system may include a first storage device that may be fabric-enabled, and a second storage device that may be fabric-enabled and connected through network fabric to the first storage device, wherein the first and second storage devices may be configured to receive user data from a user, and cooperatively erasure code the user data into redundancy blocks. The user data may be partitioned between the storage devices by a user, and the first and second storage devices may be configured to group the user data into redundancy blocks independently of the partitioning of the user data by the user. The redundancy blocks may be arranged in reliability groups. The first and second storage devices may be configured to recover data based on one or more of the redundancy blocks.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Erasure coding (EC) may refer to storage systems that may be implemented at a system level where a centralized process may partition user data into fixed-sized data chunks and calculate parity chunks based on the data chunks. The data and parity chunks may then be distributed across multiple storage devices which may be passive participants that may not necessarily track which chunks are data chunks and which chunks are parity chunks. System-level EC may also be implemented without a user and/or application necessarily tracking the size, boundaries, and/or storage locations of the data chunks and/or parity chunks.

Figure 1:
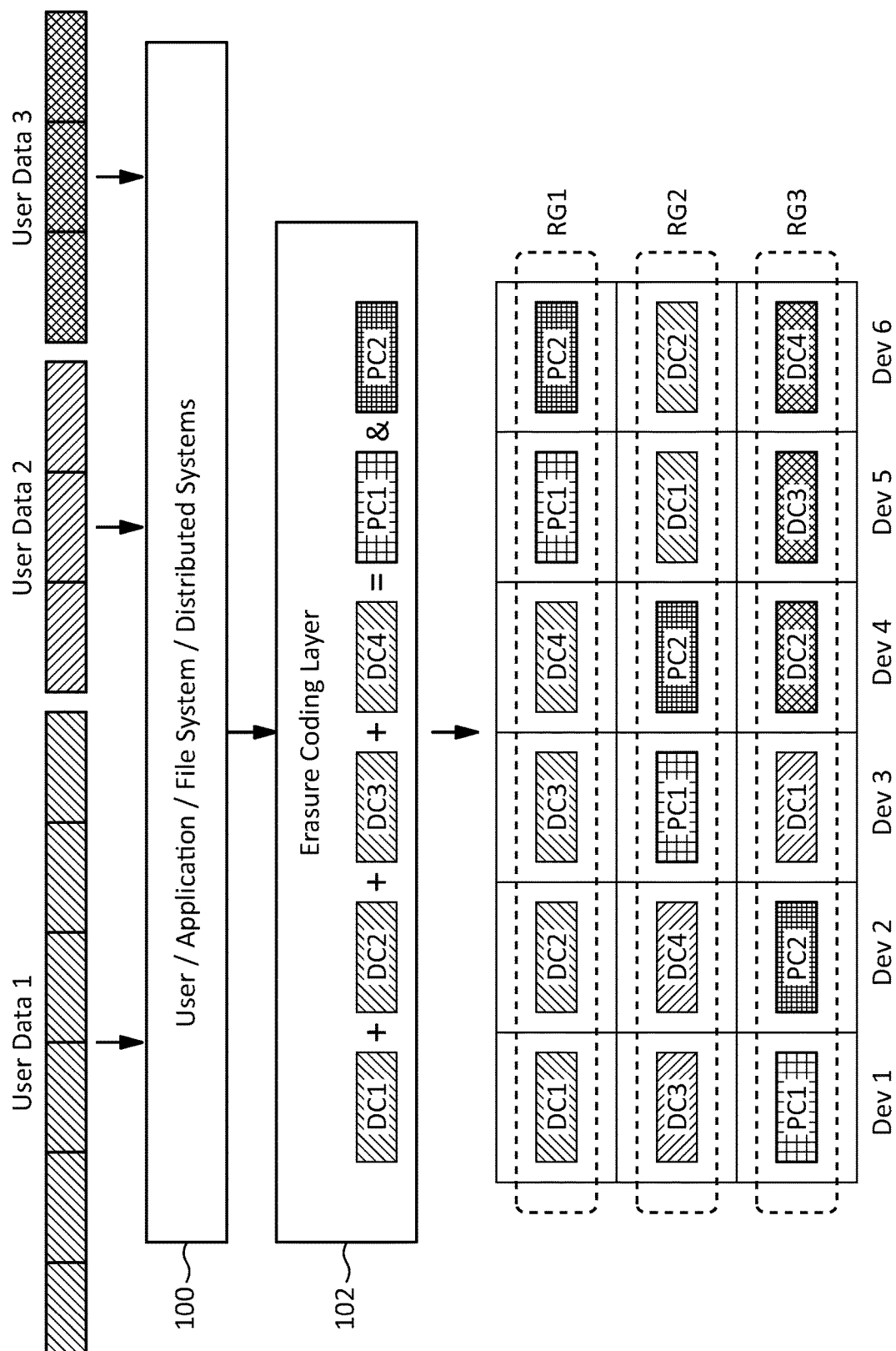
FIG. 1 illustrates a technique for implementing erasure coding in a storage system having multiple storage devices according to this disclosure.

FIG. 1 illustrates a technique for implementing erasure coding in a storage system having multiple storage devices according to this disclosure. Three different files or other units of user data are indicated as User Data 1, User Data 2 and User Data 3. This user data may be provided to, and/or generated by, a user, an application, a file system, and/or distributed systems 100. (For convenience, the user and/or application and/or file system and/or distributed systems 100 may be referred to as a user or user/application.) An erasure coding layer 102 may partition or split the user data into fixed-size data chunks, calculate parity chunks from the data chunks using any suitable EC algorithm, and distribute the data and parity chunks across multiple storage devices Dev 1 through Dev 6. In the system illustrated in FIG. 1, the erasure coding layer 102 may process four data chunks at a time and calculate two parity chunks for each batch of four data chunks. The four data chunks and two associated parity chunks may be referred to as a reliability group which are distributed across Dev 1 through Dev 6. For example, in FIG. 1, the erasure coding layer 102 is shown processing four data chunks from User Data 1 and generating two parity chunks which may form a first reliability group RG1 that is stored across Dev 1 through Dev 6. Likewise, the erasure coding layer 102 may process the two remaining data chunks from User Data 1 along with two data chunks from User Data 2 to generate two parity chunks that may be stored as reliability group RG2. Similarly, the one remaining data chunk from User Data 2 may be processed with the three data chunks from User Data 3 to generate two more parity chunks that may be stored as reliability group RG3.

Although User Data 1, User Data 2 and User Data 3 are shown divided into equal size chunks at the top of FIG. 1, the user and/or application and/or system that provided the data may not be aware of the number and/or size and/or arrangement of the chunks because the partitioning of the user data may be performed by the erasure coding layer 102. Thus, the dividing lines in the user data may be shown as a visualization aid to understand where the original user data may be distributed throughout the storage devices Dev 1 through Dev 6 after the EC process. User Data 1, User Data 2 and User Data 3 are shown with different types of shading to aid in identifying the locations of their respective data chunks.

In the technique illustrated in FIG. 1, the data and/or parity chunks may be aligned on logical block addresses (LBAs). Such a data chunk may be referred to as a logical block address unit (LBA unit) or just "LBA" for short. That is, LBA may refer to a logical block address, or a unit of data aligned on a logical block address.

Depending on the implementation details, centralized EC techniques as described above may present various problems and challenges. For example, centralized encoding of write data and decoding of read data) may cause a processing bottleneck at the system level. This may occur if there are dissimilar types and/or different sources of data for different storage devices, which may be a common occurrence in systems with multiple storage devices. For example, in a system-level centralized EC technique, data from multiple distributed nodes may have to flow artificially through a central node where calculations for EC are performed before flowing back to distributed storage devices. Thus, in addition to a processing bottleneck, there may be a data flow bottleneck at a central processing location.

An additional potential problem with centralized EC techniques is that updating a chunk of data on one storage device may require reading one or more corresponding data chunks in a reliability group from other storage devices, recalculating one or more parity chunks for the reliability group, and writing the one or more recalculated parity chunks back to the other storage devices. These update-driven parity rewrites may result in write amplification which may reduce the throughput and/or lifespan of the storage devices.

A further potential problem with centralized EC techniques is that they may typically be based on LBAs, and thus, an entire failed drive may be reconstructed rather than just the actual user data that was written to the drive. This may result in a lengthy recovery process for a storage device. Moreover, this may become increasingly problematic as the size and/or density of storage devices increases.

Yet another potential problem with centralized EC techniques is that they may cause inefficient use of computational storage devices. Computational storage devices may include computational resources at the device so that computations may be performed on data where it is stored. This may reduce input/output (I/O) traffic on the storage device as well as burdens on other compute, memory, storage and/or I/O resources. However, if an EC technique is applied to computational storage devices, the partitioning and distribution of user data across storage devices may be controlled by a system-level erasure coding layer which may be unaware of a computation strategy of a user and/or application. Therefore, the computational resources in the storage device may only operate on data partitions that are determined by an EC algorithm, and which may not be ideal or efficient for the computations. In some cases, this may lead to inefficient operation and/or under-utilization of computational storage devices.

Figure 2:
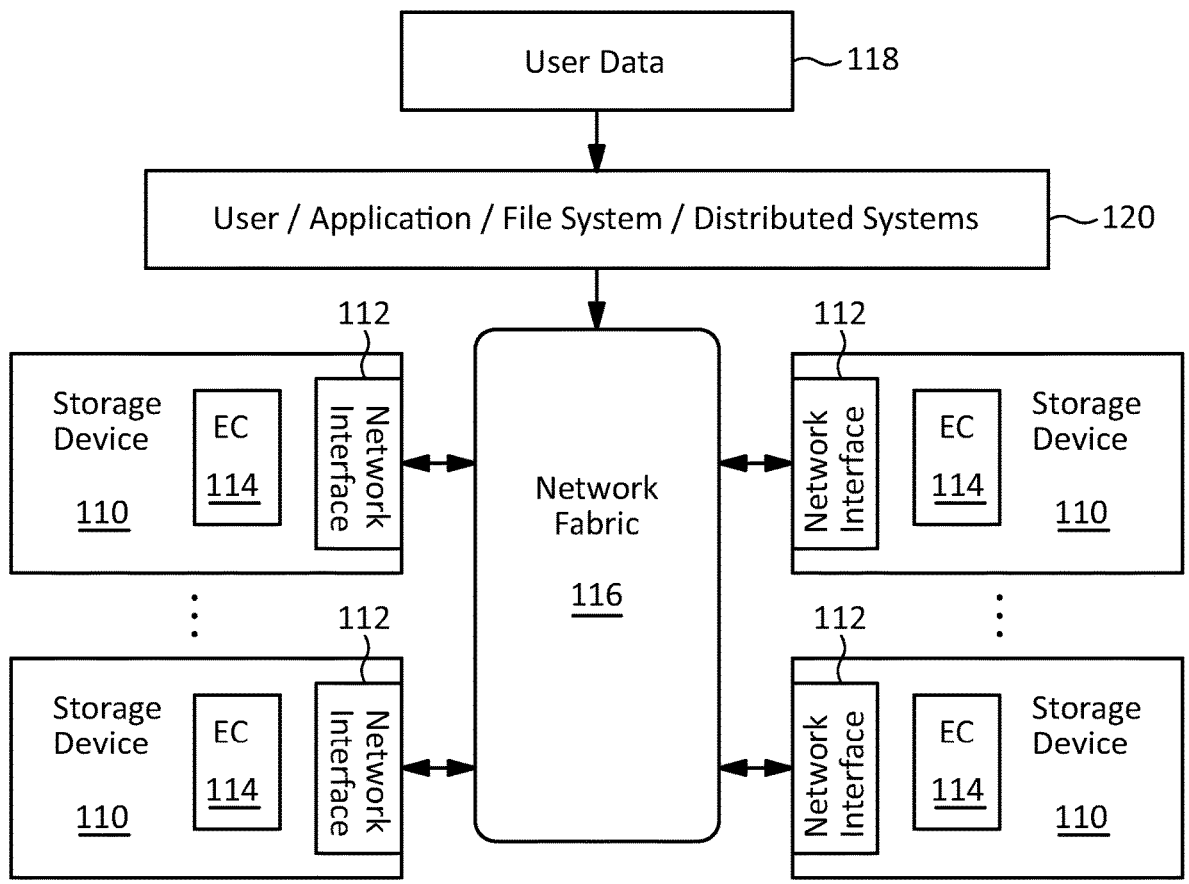
FIG. 2 illustrates an embodiment of a data storage system according to this disclosure.

FIG. 2 illustrates an embodiment of a data storage system according to this disclosure. The system illustrated in FIG. 2 may include a group of one or more fabric-enabled storage devices 110, each of which may include a network interface 112 configured to couple the storage device to network fabric 116. Each storage device may also include erasure coding (EC) logic 114 which may be configured to perform erasure coding cooperatively with other storage devices on user data 118 received through the network fabric 116 from a user, application, file system, or other data source 120. The user, application, file system, or other data source 120 may be referred to simply as a user or user/application.

In the system illustrated in FIG. 2, the partitioning of user data 118 for distribution to different storage devices 110 may be decoupled from data partitioning in the EC process. Moreover, the EC calculations may be offloaded to the storage devices 110. For example, the user 120 may retain control over the size and boundary locations of data chunks that are stored on different storage devices 110, while the EC logic 114 in the storage devices 110 may initiate and erasure code the data at a different granularity than the partitioning implemented by the user. If any of the storage devices 110 have computational storage capabilities, this may enable the user to partition the user data and distribute it among the storage devices 110 in a manner that is suitable for the user's in-storage computational needs and/or a manner that improves or optimizes the efficiency and/or utilization of any computational storage resources in the storage devices 110. This arrangement may also enable the EC logic 114 in each of the storage devices 110 to communicate with the EC logic in other storage devices to initiate EC and autonomously arrange the data into redundancy blocks of any size, number, and/or arrangement, calculate parity blocks of any size, number, and/or arrangement, and arrange the redundancy and parity blocks into reliability groups of any size, number, and/or arrangement, in a cooperative manner. Being able to communicate through the network fabric may also enable the storage devices 110 to implement delayed erasure of stale, invalid, or dead data and other features as described below.

The network fabric 116 may be implemented with any suitable networking protocol and/or media such as Ethernet, Fibre Channel, InfiniBand, and the like, as well as any other communication or interconnect protocol that may enable communication between storage devices such as peripheral component interconnect express (PCIe), Serial ATA (SATA), Serial Attached SCSI (SAS), OCuLink, and the like, whether directly or through an intermediary apparatus such as switch, hub, etc., which may also be part of the network fabric 116.

Figure 3:
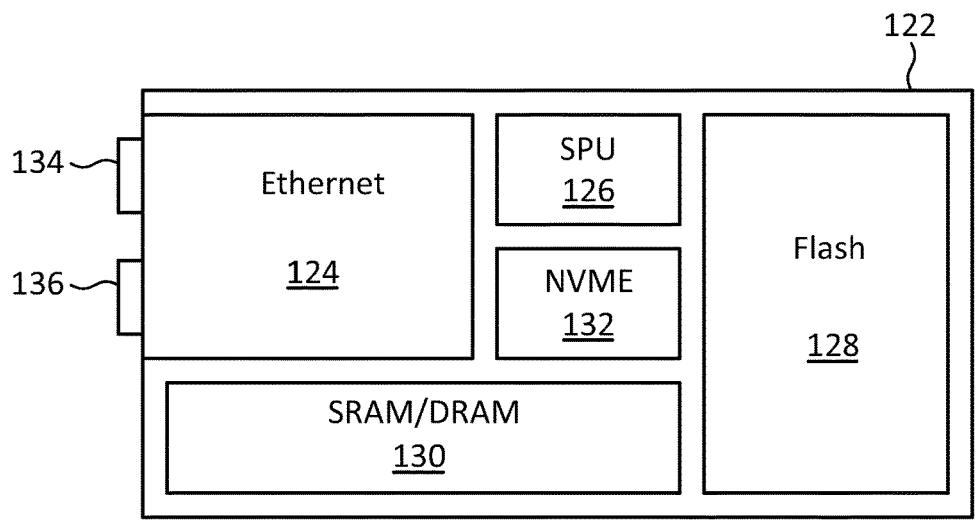
FIG. 3 illustrates an example embodiment of a storage device according to this disclosure.

FIG. 3 illustrates an example embodiment of a storage device according to this disclosure. The storage device 122 illustrated in FIG. 3 may include a network interface 124, a storage processing unit (SPU) 126, a storage media 128, memory 130, and a storage interface 132. In this example embodiment, the network interface 124 may include two ports or more 134 and 136 and may be implemented with any suitable networking protocol and/or media such as those that may be used to implement the network fabric 116 as discussed above with respect to FIG. 2, whether directly or through an intermediary apparatus such as switch, hub, etc. In other embodiments, a number and/or types of ports and/or interfaces may be included.

The SPU 126 may be implemented with any suitable processing apparatus including a microprocessor, microcontroller, etc., implemented as a system-on-chip (SOC), field programmable gate array (FPGA), a combination of standard and/or custom integrated circuits (ICs), application specific integrated circuits (ASICs), and the like, or any combination thereof.

The SPU 126 may include or implement EC logic which may be used to implement any erasure coding functionality according to this disclosure. The SPU 126 may also include or implement computational storage logic which may provide processing functionality for computational storage according to this disclosure. The SPU 126 may also include or implement any other functionality according to this disclosure such as write acknowledgment, determining whether to erase (garbage collect) data or request a new EC reliability group, etc., as discussed below.

The storage media 128 may be implemented with solid state storage such as flash memory as shown in FIG. 3, as well as magnetic media, optical media, etc., or any other suitable storage media or any combination thereof. The memory 130 may be implemented with any type of random access memory (RAM) such as static RAM (SRAM) and/or dynamic RAM (DRAM) as shown in FIG. 3, as well as persistent memory (PMEM), non-volatile RAM (NVRAM), or any other type of memory and/or combination thereof.

The storage interface 132 may be implemented with non-volatile memory express (NVMe) as shown in FIG. 3, as well as SATA, SAS, or any other storage interface. If the network interface 124 is implemented at least partially with Ethernet or other network protocol, using NVMe for the storage interface 132 may provide NVMe over fabric (NVMe-oF) functionality.

The example embodiment of the storage device 122 illustrated in FIG. 3 may be used, for example, to implement any or all of storage devices 110 illustrated in FIG. 2 above, as well as in FIG. 4 below and/or any other storage devices discussed or disclosed herein. Some other embodiments may not include all of the elements illustrated in FIG. 3, and in some embodiments, any or all of the components may be realized separately, integrally, or any combination thereof.

Figure 4:
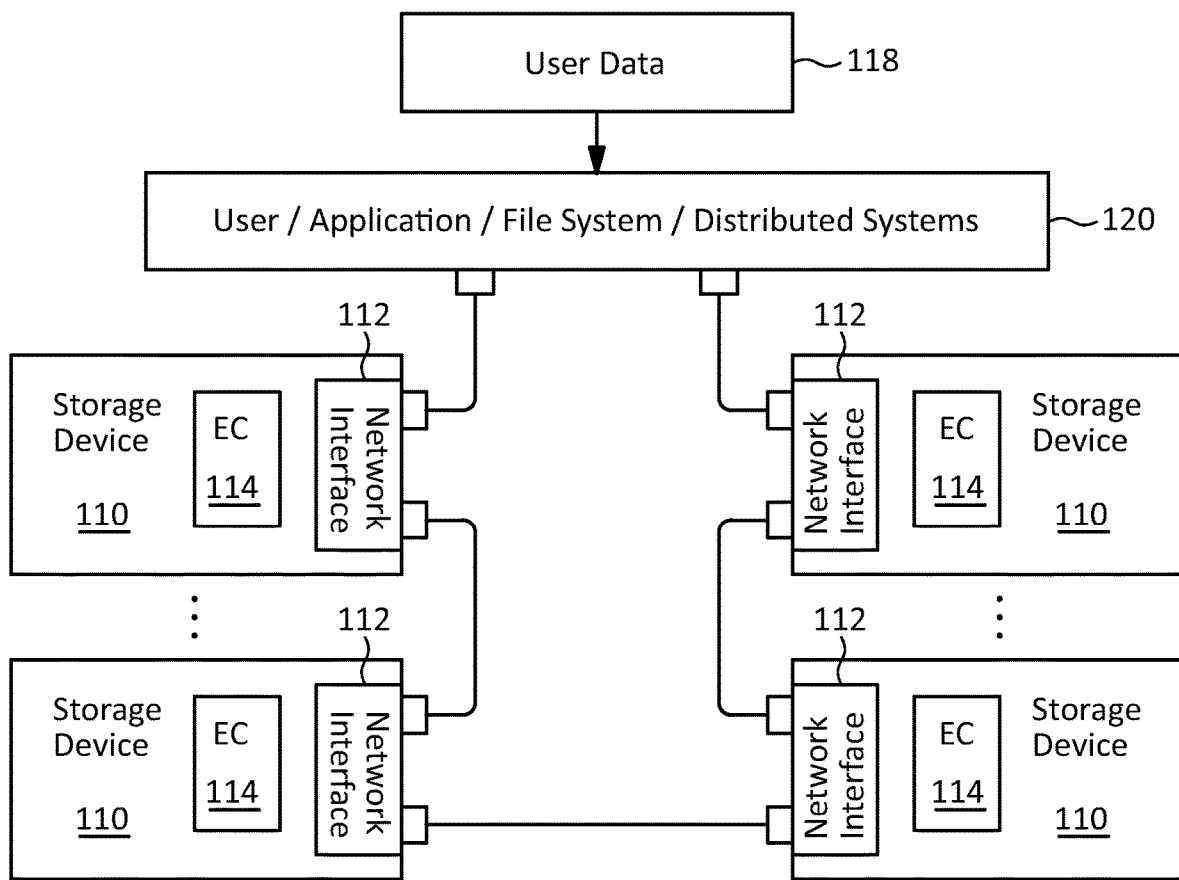
FIG. 4 illustrates another embodiment of a data storage system according to this disclosure.

FIG. 4 illustrates another embodiment of a data storage system according to this disclosure. The system illustrated in FIG. 4 may be similar to that illustrated in FIG. 2 but may include, for example, storage devices 122 such as those illustrated in FIG. 3 arranged in a circular or ring topology or any topology which may enable efficient communication between neighboring storage devices 122 for implementing device-driven EC according to this disclosure. In some embodiments, the network topology may enable peer-to-peer communication between fabric enabled storage devices, for example, without intervention by a user or host.

Figure 5:
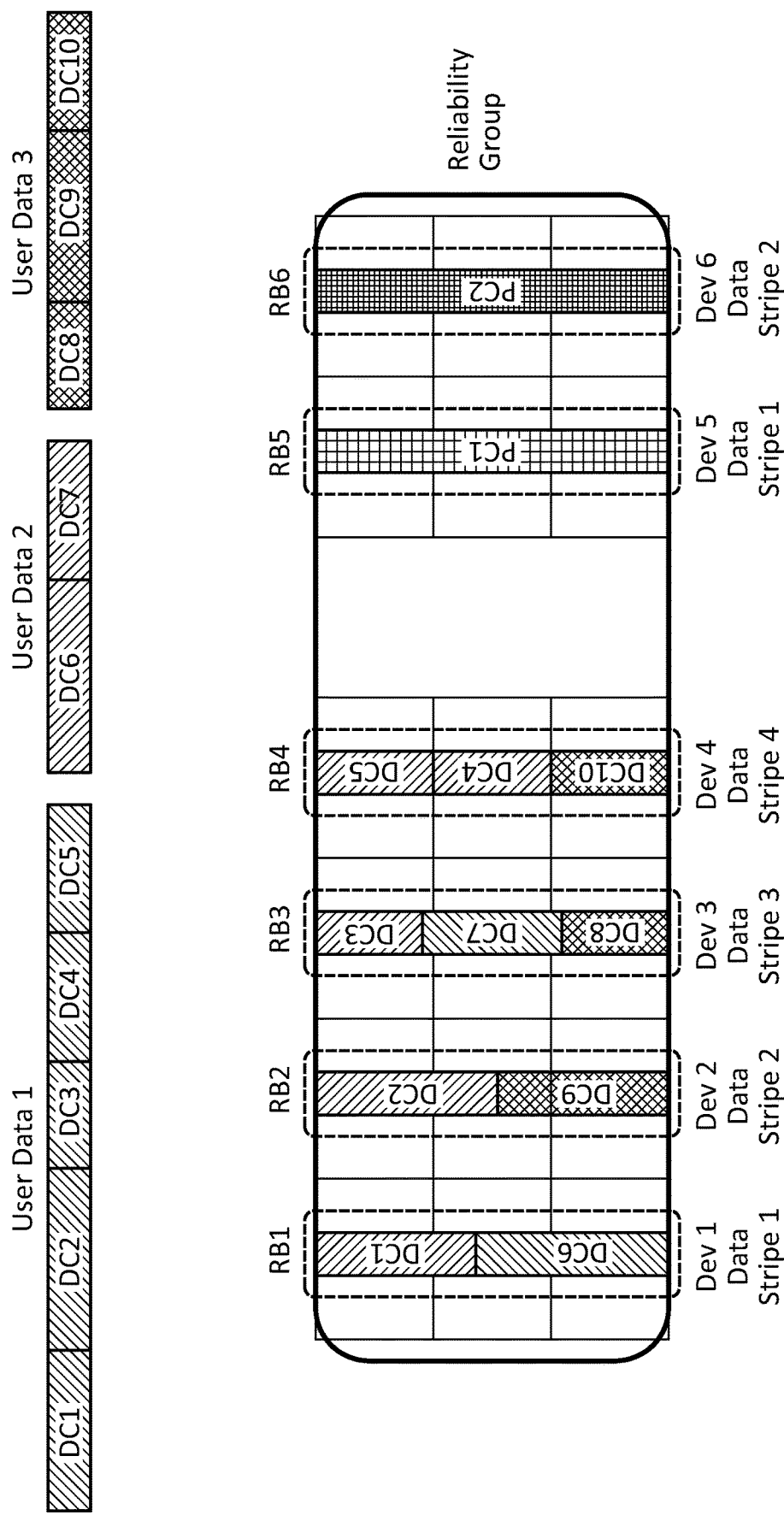
FIG. 5 illustrates an example embodiment of a technique for implementing erasure coding according to this disclosure.

FIG. 5 illustrates an example embodiment of a technique for implementing erasure coding (EC) according to this disclosure. In the embodiment of FIG. 5, the EC technique may, for purposes of illustration, begin with user data such as User Data 1, User Data 2 and User Data 3 which may be essentially the same as the beginning user data illustrated in FIG. 1. The user data are shown with different types of shading in FIG. 5 to aid in identifying the locations of their respective data chunks, and to understand how they are processed.

In the embodiment illustrated in FIG. 5, the user data may be partitioned by a user into different sized chunks that may improve or optimize the efficiency and/or utilization of computational storage resources, if any are included, in the storage devices in which the individual chunks are stored. For example, the user may partition User Data 1 into different-sized data chunks DC1, DC2, DC3, DC4 and DC5 because they may each include an amount and/or type of data that may be related in such a way that computations may be performed efficiently or optimally on each chunk. The user may store data chunks DC1, DC2 and DC3 on storage devices Dev 1, Dev 2 and Dev 3, respectively. Data chunks DC4 and DC5 may be stored on storage device Dev 4.

Likewise, the user may partition User Data 2 into data chunks DC 6 and DC7, which are stored on Dev 1 and Dev 3, respectively, and the user may partition User Data 3 into data chunks DC8, DC9, and DC10, which are stored on Dev 2, Dev 3 and Dev 4, respectively.

Figure 6:
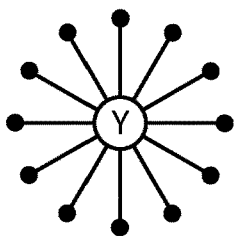
FIG. 6 is a visual representation of a graph computation according to this disclosure.
Figure 7:
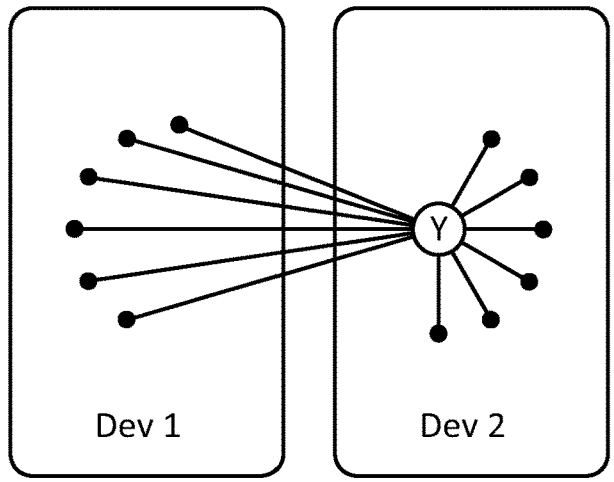
FIG. 7 illustrates a graph computation that may operate on data split between multiple storage devices according to this disclosure.
Figure 8:
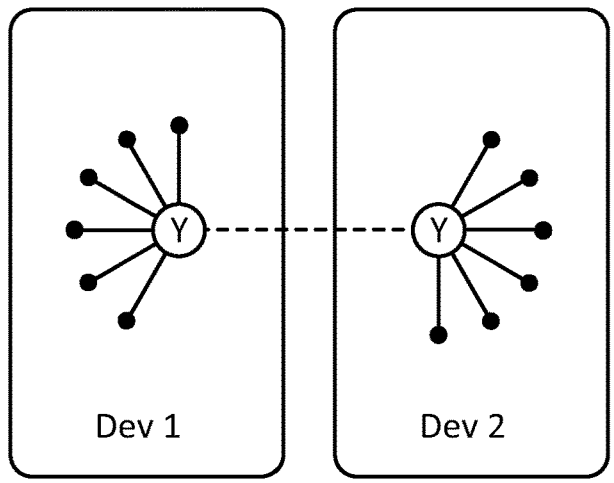
FIG. 8 illustrates an example embodiment of a technique for splitting a graph computation between multiple storage devices according to this disclosure.

Moreover, the user may store multiple copies of the same data on more than one storage device. This may be beneficial, for example, if the same data may be used in computations with other data on other storage devices. FIGS. 6-8 illustrate an example of such a data set and computation according to this disclosure, FIG. 6 is a visual representation of a graph computation where a central value Y may be included in computations with other values that are located radially outward around Y. If the entire graph needs to be split between two storage devices, storing Y on only one of the devices as shown in FIG. 7 may require more synchronization and data transfers between the storage devices (as indicated by the solid lines crossing between the two storage devices) to complete the calculations. However, if a copy of is stored on both storage devices (as indicated by the dashed line connecting both copies of Y) as shown in FIG. 8, the calculations may be completed with less synchronization and no or fewer data transfers between the storage devices.

User data may be stored in storage devices in the form of LBAs and/or key-value sets (KVs). The storage devices, however, may group LBAs and/or KVs into redundancy blocks and assign redundancy block addresses (RBAs) for user data stored in the device. Thus, storage devices may perform both LBA/KV and RBA management. The storage devices may group LBA/KV user data into RBAs which, in some embodiments, may most likely be blocks of contiguous newly written data that may likely be erased together. RBAs may be implemented in any suitable size. In the example illustrated in FIG. 5, each RBA may include three LBAs. RBAs may refer to both redundancy block addresses as well as the blocks of data stored on RBA boundaries.

Referring again to FIG. 5, the storage devices may communicate with each other to group newly written user data in one device with newly written data in another device. After grouping user data into data RBAs, EC logic in each of the storage devices may initiate and/or participate in EC parity calculations to calculate one or more parity RBAs which, together with the data RBAs, may eventually be grouped into one or more reliability groups. Alternatively, or additionally, EC logic may also perform local computations, for example, compression, encryption, and/or the like, on the data RBAs to transform data to be sent to one or more other devices. Each of the storage devices may decide and/or negotiate the sizes of the RBAs with other devices, as well as when to initiate erasure coding for the data RBAs. After these negotiations, the size and arrangement of reliability groups, participating neighboring devices, etc., may be decided cooperatively by the storage devices.

The timing of erasure coding of RBAs may be based on various considerations according to the principles of this disclosure. For example, the erasure coding of a group of RBAs may be delayed until one or more of the RBAs have been filled to a specific absolute amount of percentage of user data. As another example, the erasure coding of a group of RBAs may be delayed until a certain time threshold has passed. In another example, the timing of erasure coding of a group of RBAs may be determined based on the availability of enough RBAs for provisioning, overprovisioning, etc. Moreover, any combination of these and/or other considerations may be used in determining the timing of erasure coding.

Referring again to FIG. 5, based on the user data in the redundancy blocks stored on Dev 1 through Dev 4, EC logic in the storage devices may calculate values for parity chunks PC1 and PC2, which are stored on storage devices Dev 5 and Dev 6, respectively.

Thus, the user may have partitioned User Data 1 through User Data 3 into data chunks DC1 through DC10 and written the data chunks into storage devices Dev 1 through Dev 4 in a manner that may best suit its computational storage needs. Separately, the storage devices may have Independently and/or autonomously grouped the data chunks into redundancy blocks RB1 through RB4 and calculated parity data in redundancy blocks RB5 and RB6. Redundancy blocks RB1 through RB6 may be collectively handled as a reliability group.

Thus, in the embodiment illustrated in FIG. 5, reads and writes related to erasure coding may be RBA-based, while reads and writes of user data may be LBA/KV-based. Moreover, although the storage device may have an underlying LBA structure, the EC logic may rearrange the LBAs into an RBA structure that may be more efficient for EC. Moreover, the EC logic may not split any user data that has been grouped by the user.

In the embodiment illustrated in FIG. 5, redundancy blocks may be aligned with data stripes on the storage drives, but any other suitable alignment may be used.

Figure 9:
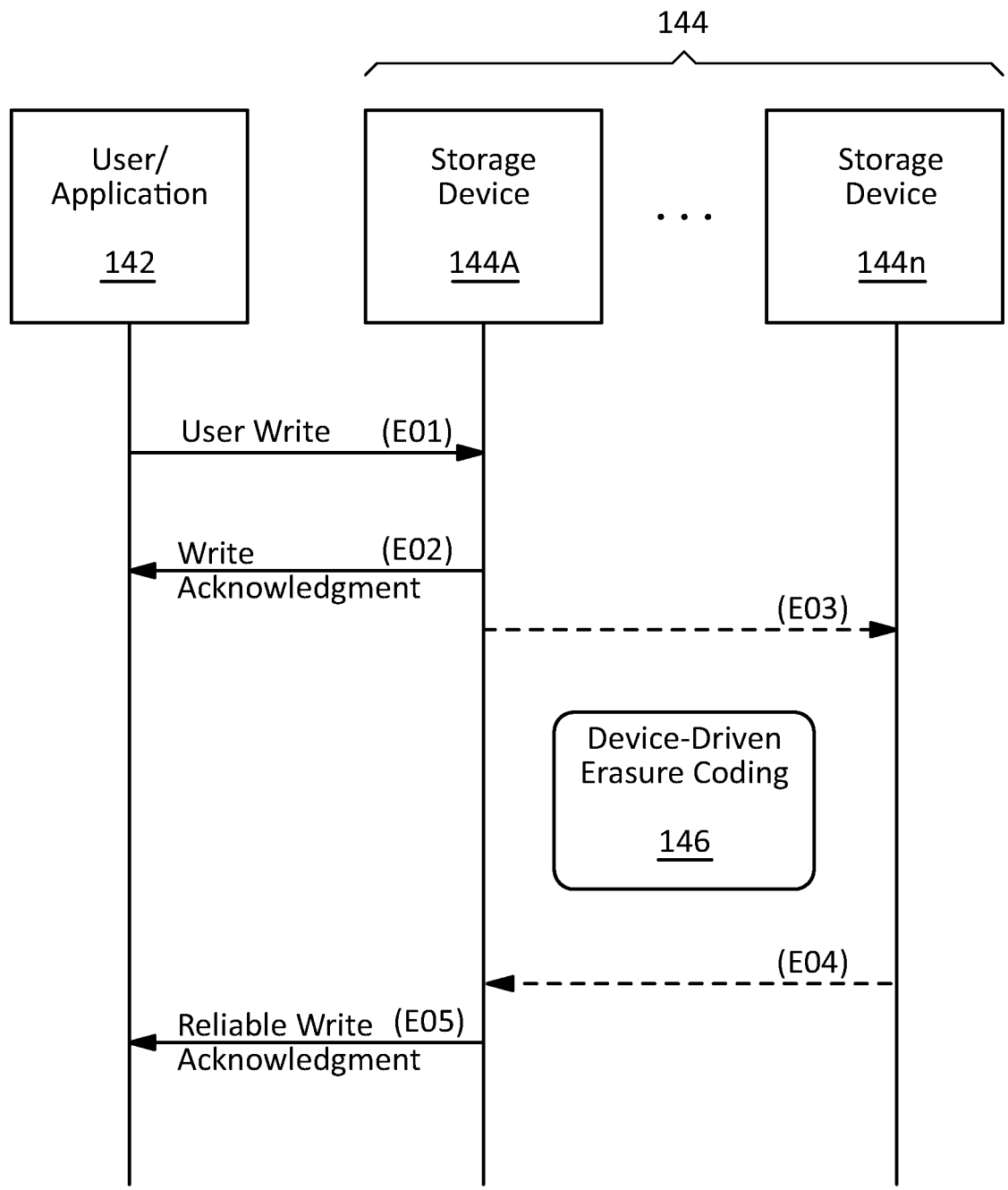
FIG. 9 is a sequence diagram illustrating an embodiment of a write and encoding operation according to this disclosure.

FIG. 9 is a sequence diagram illustrating an embodiment of a write and encoding operation according to this disclosure. The operation may begin at event E01 with a user/application 142 transmitting write data to a first storage device 144A in a group 144 of fabric-enabled, EC-capable storage devices. At event E02, the first storage device may transmit a first write acknowledgement back to the user/application 142. This first write acknowledgement may indicate that the first storage device 144A received the write data, but may not indicate that it has been erasure coded yet. At event E03, the first storage device 144A may communicate with one or more of the other storage devices in the group to initiate erasure coding of the write data. An erasure coding operation 146 may be performed cooperatively among any number of storage devices that may have new and/or updated data to erasure code, and at any time based on the amount of data received by various storage devices, the availability of RBAs, any time thresholds, etc. The erasure coding operation 146 may be similar, for example, to the embodiment illustrated above with respect to FIG. 5. At event E04, the erasure coding of the write data from user/application 142 may be completed. At event E05, the first storage device 144A may send a second write acknowledgment to the user/application 142. The second acknowledgment may be reliable acknowledgment indicating that the write data has been stored and erasure coded.

The write and encoding operation illustrated in FIG. 9 may be part of, or occur in parallel with, other such operations, for example, with the same user/application 142 and/or other users/applications initiating data transfers to the same or other storage devices in the group 144. Thus, the erasure coding operation 146 may encode write data from multiple sources across multiple storage devices.

Some storage devices may have overwrite restrictions that may limit the ability of the device to write to specific storage locations. For example, storage devices with not-AND (NAND) flash storage media may only be able to erase data in whole erase blocks. To update a portion of data in any given erase block, the updated data may be written to a new block, along with other data in the erase block that may not need to be updated. This update may trigger a recalculation and re-write of parity data in storage systems with system-level erasure coding. The old data may be marked for later erasure in a garbage collection process. Thus, previous versions of user data may be present for a significant amount of time in storage devices that utilize garbage collection processes.

As discussed above, recalculation and re-writing of parity data triggered by data updates may contribute to write amplification which may reduce the performance and lifetime of a storage device. In a system with offloaded erasure coding according to this disclosure, storage devices that utilize garbage collection processes may be able to take advantage of previous versions of data to implement erasure coding in a manner that may reduce read and write amplification caused by update-triggered parity re-calculations. Moreover, in some embodiments, device-driven erasure coding according to this disclosure may also take advantage of old data prior to garbage collection to facilitate recovery and/or repair of other redundancy blocks prior.

Figure 10:
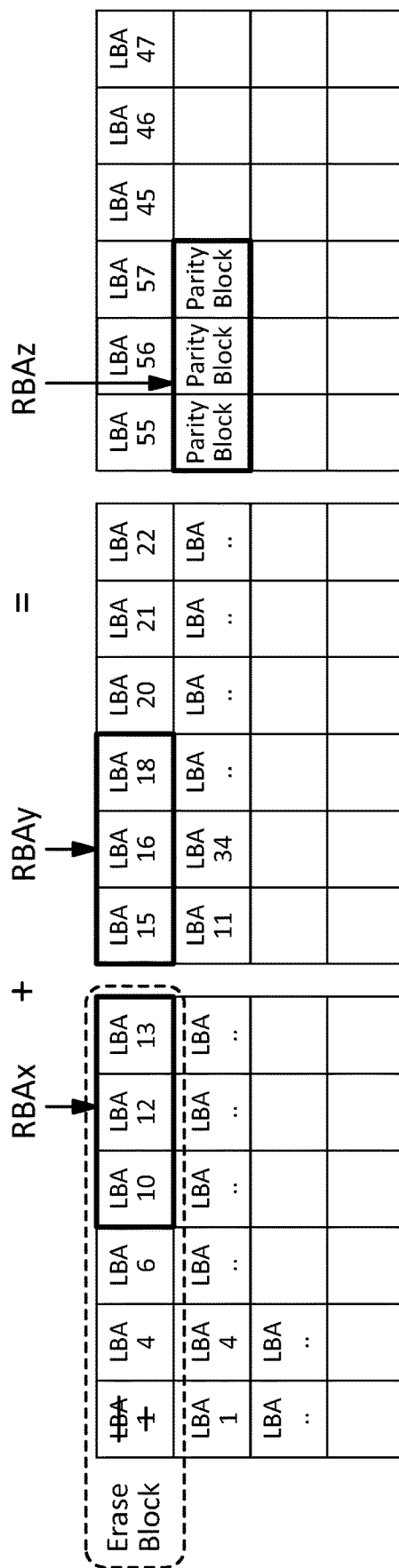
FIG. 10 illustrates an example of how a device-driven erasure coding process according to this disclosure may interact with an erase operation in a storage device that utilizes garbage collection according to this disclosure.

FIG. 10 illustrates an example of how a device-driven EC process according to this disclosure may interact with an erase operation in a storage device that utilizes garbage collection. Storage devices Dev 1, Dev 2, and Dev 3 may each include numerous LBAs arranged in rows that may form erase blocks, for example, for NAND flash storage. In this example, the EC process may divide user data into RBAs that each include three LBAs. For example, RBAx in Dev 1, RBAy in Dev 2, and RBAz in Dev 3 may form a reliability group (or erasure group) in which RBAz may include the parity data for the group.

If data in LBA 1 needs to be updated, it may be re-written with updated data in the next row down as shown in FIG. 10, along with all of the other LBAs in the top row which forms an erase block. In a system with system-level EC, when LBA 1 is updated, it may trigger an immediate update of every LBA in the erase block, i.e., the top row.

However, in a system with device-driven EC according to this disclosure, there may be no need to update parity data for every LBA in an erase block because, for example, one or more LBAs may be in a different RBA than the data that changed. In the example illustrated in FIG. 10, the data in RBAx may not have been changed by the update to LBA1, and may not change until the entire top row (erase block) is garbage collected. Therefore, a parity re-calculation and re-write for RBAx may be delayed until garbage collection happens which may reduce read and write amplification. Thus, in a storage device according to this disclosure, some calculations for erasure coding may be tied to garbage collection instead of data updates.

Figure 11:
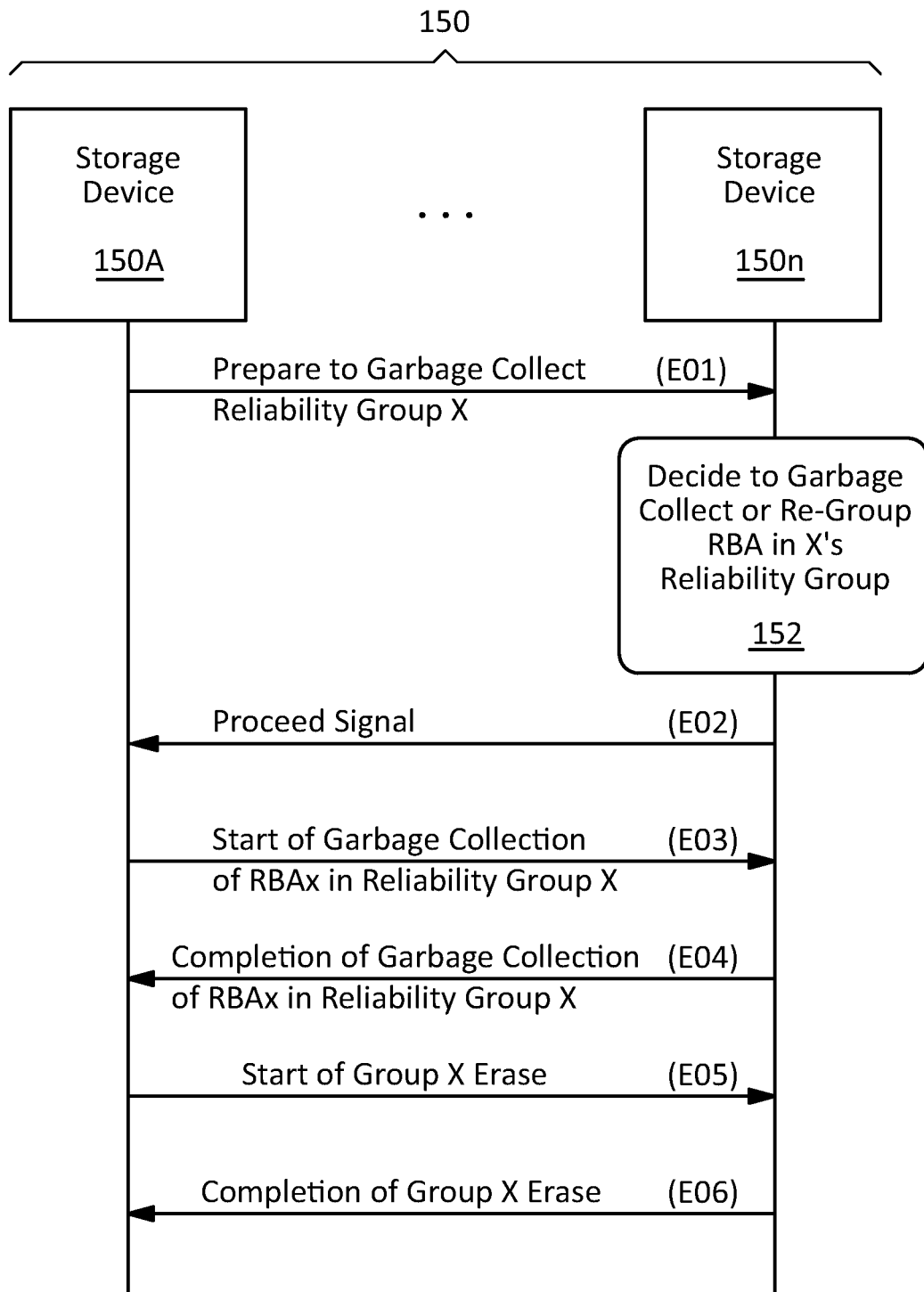
FIG. 11 is a sequence diagram illustrating an example embodiment of a process for coordinating erasure coding and garbage collection according to this disclosure.

FIG. 11 is a sequence diagram illustrating an example embodiment of a process for coordinating erasure coding and garbage collection according to this disclosure. At the beginning of the process, a first storage device 150A in a group 150 of fabric-enabled, EC-capable storage devices may determine that an RBA is to be erased, for example, because garbage collection may be imminent. This RBA may be part of a reliability group X. The process may begin at event E01 when the first storage device 150A may notify all other storage devices which may have an RBA in reliability group X of the impending erase of the RBA in the first storage device 150A. All of the other storage devices having an RBA in reliability group X may conduct a decision making process 152 in which each storage device may examine its own RBA in reliability group X and determine whether it should mark its RBA in reliability group X for garbage collection, or request that its RBA in reliability group X be added to a new reliability group (erasure group). After either marking its RBA in reliability group X for garbage collection, or requesting (and verifying completion of) adding its RBA in reliability group X to a new reliability group, each other storage device may send a proceed signal to the first storage device 150A at event E02. Thus, if an LBA block is determined to be dead, an RBA containing that LBA may be checked across every other storage device that may still potentially need that RBA for recovery before it is garbage collected.

After receiving a proceed signal from every other storage device having an RBA in reliability group X, the first storage device 150A may notify every other storage device having an RBA in reliability group X to begin the garbage collection process at event E03. After each other storage device having an RBA in reliability group X completes the garbage collection process on its RBA in reliability group X, it may send a garbage collection complete signal to the first storage device 150A at event E04. The first storage device 150A may then notify every other storage device that previously had an RBA in reliability group X to begin the erase process for reliability group X at event E05. After each other storage device having an RBA in reliability group X completes the erase process on reliability group X, it may send an erase complete signal to the first storage device 150A at event E06.

A read operation in system or device having EC according to this disclosure may proceed the same as in a system unless an error is detected, in which case a storage device may begin an error recovery process.

Figure 12:
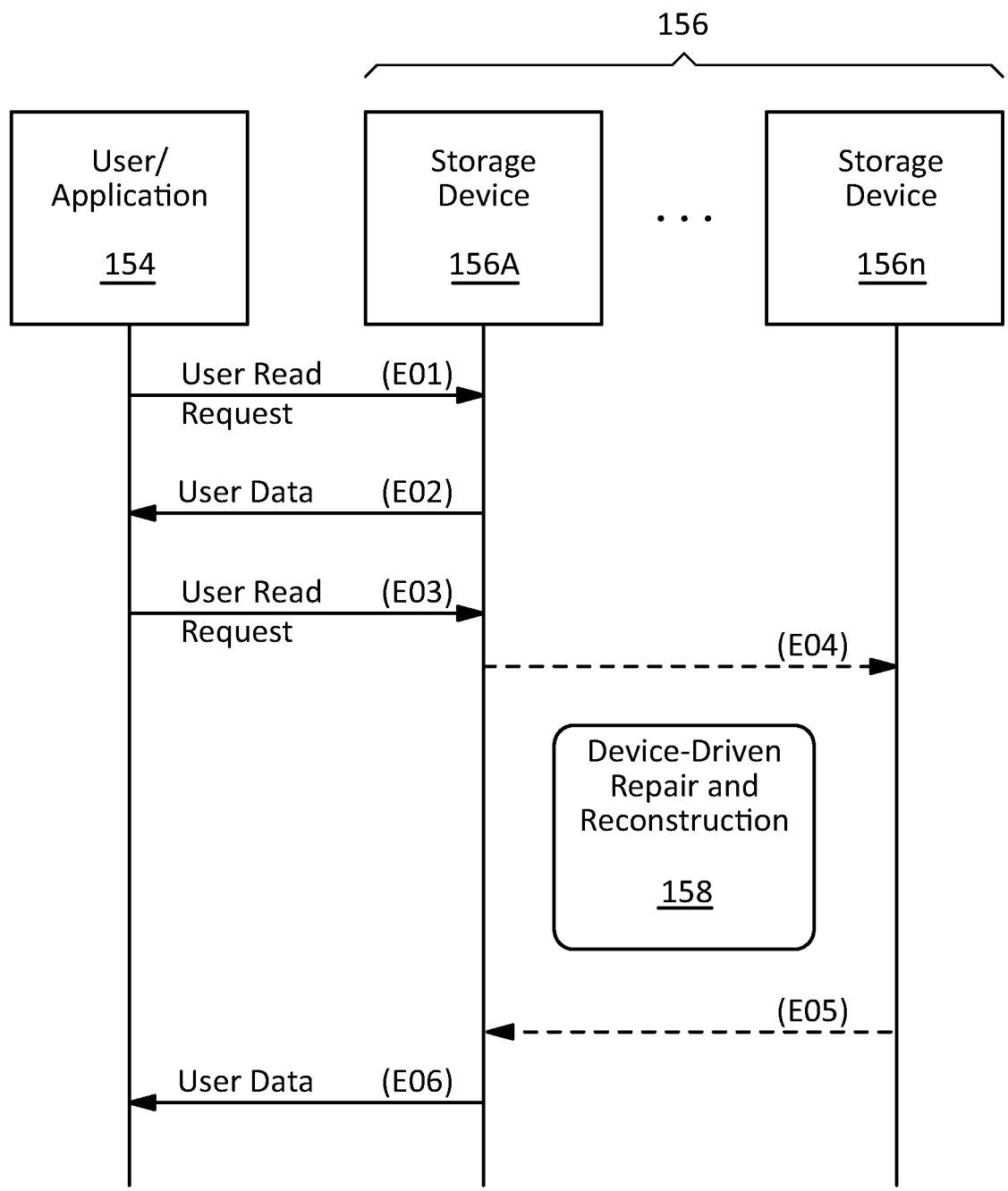
FIG. 12 is a sequence diagram illustrating an embodiment of data read operations and a repair and/or reconstruction process according to this disclosure.

FIG. 12 is a sequence diagram illustrating an embodiment of some data read operations along with a repair and/or reconstruction process according to this disclosure. A user/application 154 may initiate a data read at event E01 by sending a read request to a first storage device 156A in a group 156 of fabric-enabled, EC-capable storage devices. No error may have been detected on this read, so the first storage device 156A may return the read data at event E02. The user/application 154 may initiate a second data read at event E03. An error may have been detected during this read operation, so the first storage device 156A may initiate a repair and reconstruction operation 158 at event E04.

During the repair and/or reconstruction operation 158, one or more of the group of storage devices 158 may utilize its ability to reconstruct all or portions of one or more RBAs containing user data. This may be facilitated, for example, by one or more of the group of storage devices 158 maintaining metadata about the reliability groups associated with their RBAs. Data may be stored in RBAs, for example, as LBAs and/or KVs, and thus, one or more of the storage devices may maintain an LBA and/or KV mapping table. One or more of the storage devices may also implement RBAs that may be self-descriptive and/or contain information on which LBAs and/or KVs are included in the RBA. RBAs may also include timestamp and/or sequence number information to facilitate data recovery.

Thus, if a storage device fails, a storage device may use any or all of the metadata, mapping table, timestamp, sequence number and/or any other of the information mentioned above, to reconstruct new RBAs by storing LBAs and/or KVs to the new RBAs and/or reconstructing a mapping table for the new RBAs. Because one or more of the storage devices may have access to any or all of the information discussed above, the one or more of storage devices may be able to reconstruct only live RBAs rather than all possible RBAs in the entire storage device. For example, neighboring storage devices that are interconnected by network fabric may be aware of which live RBAs need to be repaired. Therefore, only the Redundancy Blocks may be recovered rather than an entire storage device.

After the repair and/or reconstruction operation 158 is complete at event E05, the recovered read data may be returned to the user/application 154 at event E06.

In some embodiments, user data that the user may have partitioned for computational storage may be aligned on LBA boundaries. In such an embodiment, the LBA-aligned chunks may be stored in block oriented devices and/or key value devices, in which case, the storage and/or management of these chunks of user data may be straightforward. In implementations in which user data may not align with LBA boundaries, the user data may be stored in KV devices, in which case, the device itself may handle size management of data structures which may be relatively simple and efficient. Alternatively, in implementations in which user data may not align with LBA boundaries, a ceiling may be established based on a data chunk and/or LBA size, and the user data may be stored in as many LBAs as permitted by the ceiling. In such an implementation, the space efficiency and management overhead may be comparable to other storage systems. As another alternative, in implementations in which user data may not align with LBA boundaries, data from different user chunks may be packed into a single LBA with indexing information that is granular enough to identify the different chunks. Such an embodiment may be space efficient and employ additional resources to manage overhead associated with packing and unpacking the user data.

The embodiments disclosed herein may have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for storing data comprising:
   receiving user data at one or more storage devices, wherein the one or more storage devices comprises at least one circuit configured to perform erasure coding;
   dividing, based on a first type of partitioning, at the one or more storage devices, using the at least one circuit configured to perform erasure coding, the user data into first erasure coded data and second erasure coded data;
   storing the first erasure coded data at a first one of the one or more storage devices; and
   accessing, based on a second type of partitioning, the user data at the first one of the one or more storage devices.

2. The method of claim 1, further comprising:
   storing the second erasure coded data at a second one of the one or more storage devices, wherein the second one of the one or more storage devices is connected to the first one of the one or more storage devices by a network fabric.

3. The method of claim 2, further comprising arranging, by at least one of the one or more storage devices, the first erasure coded data and the second erasure coded data.

4. The method of claim 2, wherein the second one of the one or more storage devices sends a reliable write acknowledgment based on the second erasure coded data.

5. The method of claim 2, wherein the first erasure coded data and the second erasure coded data are arranged in a reliability group.

6. The method of claim 5, wherein at least one of the one or more storage devices maintains metadata about the reliability group.

7. The method of claim 1, wherein:
   at least one of the one or more storage devices comprises a computational resource; and
   a user partitions the user data between the one or more storage devices based, at least in part, on the computational resource.

8. The method of claim 1, further comprising recovering at least a portion of the second erasure coded data based on a live portion of the first erasure coded data.

9. The method of claim 1, wherein at least a portion of the first erasure coded data is self-descriptive to facilitate data recovering.

10. The method of claim 1, wherein the first one of the one or more storage devices informs a second one of the one or more storage devices that at least a portion of the first erasure coded data is designated for erasure.

11. The method of claim 10, wherein:
the second one of the one or more storage devices sends a signal to the first one of the one or more storage devices; and
the first one of the one or more storage devices, based on receiving a signal from the second one of the one or more storage devices, performs an erasure of at least a portion of the first erasure coded data.

12. The method of claim 11, wherein the first erasure coded data and the second erasure coded data are arranged in a reliability group.

13. The method of claim 12, wherein one of the one or more storage devices calculates parity for the reliability group based on the erasure.

14. A storage device comprising:
a storage medium;
a network interface configured to communicate with one or more other storage devices using a network fabric, wherein the network interface is configured to receive user data to generate received user data; and
a storage processing unit configured to:
divide, based on a first type of partitioning, at least a portion of the received user data into first erasure coded data and second erasure coded data;
store the first erasure coded data in the storage medium; and
access, based on a second type of partitioning, the user data at the storage medium.

15. The storage device of claim 14, wherein the storage processing unit is configured to divide the user data cooperatively with at least one of the one or more other storage devices.

16. The storage device of claim 14, wherein the storage processing unit is configured to recover data based on the first erasure coded data.

17. The storage device of claim 14, wherein the storage processing unit is configured to perform a parity calculates based on a garbage collection operation on the first erasure coded data.

18. A data storage system comprising:
a first device that is fabric-enabled; and
a second device that is fabric-enabled and connected using a network fabric to the first device, wherein the second device comprises a storage medium;
wherein the first device is comprises at least one circuit configured to:
receive user data from a user to generate received user data;
divide, based on a first type of partitioning, the received user data into first erasure coded data and second erasure coded data;
store the first erasure coded data at the second device; and
access, based on a second type of partitioning, the user data at the storage medium.

19. The data storage system of claim 18, wherein the at least one circuit is configured to divide the user data cooperatively with the second device.

20. The data storage system of claim 18, wherein the first and second devices are configured to recover data based at least the first erasure coded data.

* * * * *